3,094,529
CAFFEINO-(8)-ALKYLENEDIAMINES

Josef Klosa, Berlin-Zehlendorf, Germany, assignor to Delmar Chemicals Limited, Lachine, Quebec, Canada, a corporation of Canada
No Drawing. Filed Sept. 11, 1959, Ser. No. 839,293
8 Claims. (Cl. 260—247.2)

The present invention relates to new caffeino-(8)-alkylenediamines of the following formula:

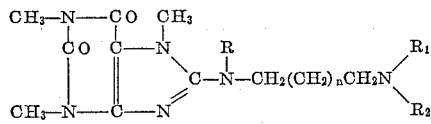

in which formula R equals H; $R_1$ is selected from H, $(CH_2)_3$, $(CH_2)_2$—O, $(CH_2)_2$ and hydroxy ethyl; $R_2$ is selected from $(CH_2)_2$, phenyl, phenylisopropyl and hydroxyethyl; $R_1$ and $R_2$ substituents may also form with the N atom a heterocyclic ring selected from piperidine, morpholine and pyrollidine; and $n$ equals 0 or 1.

I found that these compounds may be prepared by a number of methods. For instance, they may be obtained by reacting 8-halogene-caffeines with alkylenediamines of the following formula:

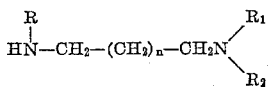

in which formula R, $R_1$, $R_2$ and $n$ have the meaning as above, in the presence of an acid-binding agent. As 8-halogene-caffeines, the 8-chloro, 8-iodo and 8-bromo-caffeine may be used, preferably the readily available 8-chlorocaffeine. As alkylenediamines N,N - diethylethylenediamine, N,N-dimethylpropylenediamine, N,N-diethylpropylenediamine, N-piperidino-ethylenediamine, N,N-diethyl-N'-ethyl-ethylenediamine, etc. may be used.

Again, the compounds of this invention may be prepared by reacting N-beta-(caffeino-(8))-aminoethyl- and N-gamma-(caffeino-(8)-aminopropyl - halogenes of the general formula:

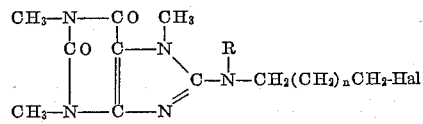

in which formula R and $n$ have the meaning as above, with primary or secondary amines, such as piperidine, morpholine, pyrrolidine, methyl-, ethyl-, n-butyl-, n-dibutyl, benzyl-, dibenzylamine, etc. in the presence of an acid-binding agent.

A third general method by which these new compounds may be prepared is by reacting N-(caffeino-(8)-alkylenediamines of the following formula:

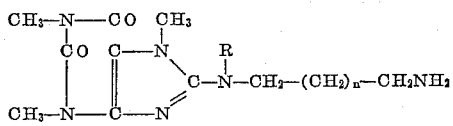

in which R and $n$ have the same meaning as before, with appropriate alkylhalides, as for example ethylenechlorohydrine, butylhalides, etc. or arylalkylhalides, like benzylbromide, in the presence of acid-binding agents. As acid-binding agents alkalicarbonates, triethylamine, etc., may be used, or also the bases used in the reaction, by using them in a 100% surplus. When halogeno-caffeines are reacted with alkylenediamines it is not necessary to use any acid-binding agents because the acid formed in the reaction is, at the same time, neutralized by the newly-formed bases.

The reaction may be carried out in a solvent, or, without a solvent, by melting together the components. Solvents for the reaction may be alcohols or hydrocarbons, like benzol, toluol, xylol, cumol, etc. Besides having interesting pharmacodynamic properties, the new compounds are distinguished by the fact that they are well soluble in water, some up to 60%. Their salts, formed with mineral acids, are very well soluble in water giving neutral solutions.

The new compounds have remarkable pharmacodynamic properties. Their toxicity is low, they have a strong and sustained hypotensive action, they reduce the frequency of the heartbeat, they improve the coronary blood-flow and they increase the urinary output. These properties constitute a combination of activities which were impossible to foresee. Also, they make these compounds particularly suitable for a therapeutic use in the treatment of circulatory diseases and hypertension. The following data demonstrate the advantages of a representative member of this new class of compounds.

| Compound | Code Name | $LD_{50}S.C.$, mg./kg. mouse |
|---|---|---|
| Caffeine | | 242 |
| 1 - N - Morpholine - 2 - (Caffeino - (8)) - Aminoethylene, Example 2 | 624 | 980 |
| Aminophylline | | 200 |
| Hydroxyethyltheophylline | | 400 |

These data establish that the toxicity of the compounds is much lower than that of caffeine, and indeed also lower than the widely used aminophylline and the 7-hydroxyalkyltheophyllines. The new compounds of the present invention do not show a stronger diuretic activity when the dose is increased to 50 mg./kg. or even 100 mg./kg. This phenomenon, namely that the diuretic activity can be observed at a certain dose but that an increase in dose does not lead to an increase in the diuretic activity, is a characteristic property of the new compounds and has not been described in connection with heretofore known xanthine-derivatives.

Derivatives of caffeine having a hypotensive-sedative effect have been described before, as for instance, the 1-phenyl-1-caffeyl-(8)-3-dialkylamine-propanes (Swiss Patent 332,328), G. Ehardt, Dtsch. Pharm. Ber. Dtsch. Pharm. Ges., vol. 289, p. 453 (1956); vol. 29 p. 18 (1957). Caffeino-(8) dialkylamino-alkylethers (U.S. Patent 2,688,618) were also described. However, the first of these compounds are rather complicated to make, and all of these compounds are much more toxic than the new compounds of the present invention. The previously known and above discussed compounds all increase the heart beat frequency in pharmacological experiments (see Dtsch. Auslegeschrift 1,008,300). They also have a positive ionotropic action, while, as already discussed, the new compounds reduce the frequency of the heart beat and improve the coronary flow.

Caffeine-ethylenediamine is also known (German Patent 142,896). However, this compound did not show any attractive pharmacologic properties, the diuretic activity being lower than that of aminophylline, and its toxicity being higher than that of the present compounds.

Compared with previously known derivatives of caffeine, the new class of compounds here described shows unexpected properties. By a strong reduction of toxicity (compared with caffeine) and vast improvement upon the relatively modest action of caffeine on the heart and circulation, the compounds of the present invention have changed the caffeine-action in an optimal manner.

The compounds of this invention are presently usable as pharmaceuticals as indicated. The preparation of some of the new compounds is more fully described in the fol-

EXAMPLE 1

*1-N-Piperidino-2-(Caffeino-(8))-Amino-Ethylene*

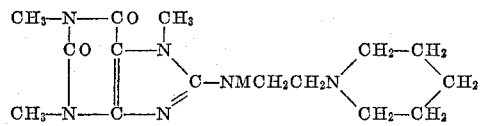

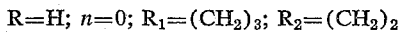

$R_1$ and $R_2$ being joined to form a piperidino ring.

0.1 mol. beta-(caffeino-(8))-aminoethylchloride and 0.2 mol. piperidine are refluxed with 40 ml. ethanol for 8 hours. Upon standing and cooling, crystals deposit. These are filtered, dissolved in water, the aqueous solution is made strongly alkaline; and oil deposits which soon turns into crystals. M.P. 195–197° C. Recrystallized from alcohol. M.P. 198–200° C. This is the base. Yield 75%.

The hydrochloride is prepared by the already described method using alcoholic hydrochloric acid and ether. It sinters at 178–180° C.; solidifies, melts at 225–227° C., solidifies again and then melts at 268° C. under decomposition.

EXAMPLE 2

*1-N-Morpholino-2-(Caffeino-(8))-Aminoethylene*

R=H; $n$=0; $R_1$=$(CH_2)_2$—O; $R_2$=$(CH_2)_2$ $R_1$ and $R_2$ being joined to form a morpholino ring.

Prepared according to the method described in Example 1, using beta-(caffeino-(8))-aminoethylchloride and morpholine. The base, recrystallized from alcohol, melts at 181–183° C., the hydrochloride at 220–222° C. The dihydrochloride may be prepared by reacting surplus alcoholic hydrochloric acid with an alcoholic solution of the base. It sinters at 170° C., solidifies and then melts at 247–249° C.

The beta-(caffeino-(8))-amino-ethylchloride required for the reactions described in Examples 1 and 2 may be prepared from beta-(caffeino-(8))-amino-ethanol and thionylchloride as follows:

10 gms. beta-(caffeino-(8))-aminoethanol are introduced in small portions into 10 ml. thionylchloride. Hydrochloride acid is developed and a solution results. After heating 20–30 minutes on the water bath, a mass of crystals is obtained. This is stirred into benzol and the mixture heated to reflux. The mixture is then cooled, the crystals filtered and recrystallized from hot methanol, M.P. 225–227° C. Yield about 11 gms.

EXAMPLE 3

*1-N-Pyrrolidino-3-(Caffeino-(8))-Aminopropylene*

R=H; $n$=1; $R_1$=$R_2$=$(CH_2)_2$ $R_1$ and $R_2$ joining to form the pyrrolidino ring.

4 gms. gamma-N-(caffeino-(8))-amino-propylchloride-(1) are refluxed in 30 ml. ethanol with 1.6 gm. pyrrolidine. Everything goes in solution. After another 4 hours pyrrolidine-hydrochloride (M.P. 138–140° C.) precipitates. This is filtered off. The filtrate is concentrated to 10 ml. and 50 ml., water is added, then the solution is made strongly alkaline, whereupon an oil precipitates which solidifies after a few hours in the ice box. The crude product has a M.P. of 173–175° C. and after recrystallization from benzol-petroleum ether, 184–185° C. Yield 80%.

The gamma-N-(caffeino-(8))-amino-propylchloride-(1) required in the reactions described in Example 3 may be prepared the same way as described for the preparation of beta-(caffeino-(8))-amino-ethylchloride in Example 2, from gamma-N-(caffeino-(8))-amino-propanol-

(1) and thionylchloride. The product, after recrystallization from alcohol, melts at 176–178° C. It is insoluble in water, poorly soluble in alcohol.

EXAMPLE 4

*N-Phenyl-N'-(Caffeino-(8))-Propylenediamine*

R=H; $n$=1; $R_1$=H; $R_2$=phenyl 28 gms. gamma-N-(caffeino-(8))-propylchloride-(1), 10 ml. aniline and 8 gms. potassium carbonate anhydrous are refluxed in 200 ml. alcohol for 5–6 hours. The inorganic salts are filtered off from the hot solution. Overnight crystals precipitate from the filtrate which, after recrystallization from alcohol, melt at 159–161° C. Yield 80%.

EXAMPLE 5

*N-(Caffeino-(8))-N'-(Phenyl-1-Isopropyl-(2))-Propylenediamine*

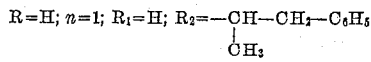

14 gms. N-(caffeino-(8))-amino-propylchloride-(1) and 13 ml. d. 1-phenyl-isopropyl-amine are refluxed in 100 ml. alcohol. A clear solution results. After 5 hours refluxing, the solution is filtered hot. On cooling overnight crystals deposit. They are filtered off, washed with a little water and recrystallized from alcohol. M.P. 163–165° C. Yield about 13 gms.

The same compound may be obtained by reacting N-(caffeino-(8))-propylenediamine with phenyl-isopropyl-bromide in the presence of anhydrous sodium carbonate.

EXAMPLE 6

*N'-(Caffeino-(8))-N-(1-Hydroxyethyl)-Propylenediamine*

R=H; $n$=1; $R_1$=H; $R_2$=—$CH_2CH_2OH$ 11 gms. 8-chlorocaffeine are mixed with 8 ml. of N-hydroxyethyl-propylenediamine to 140.160° C. At this point the taking place of the reaction is indicated by a sudden rise of temperature to 180° C. After another 30 minutes heating, the mass thickens. Heating is continued for another 10 minutes, then the mass is allowed to cool and it is then taken up in a little alcohol to which an equal volume of water is added. This solution is made strongly alkaline. A milky cloudiness develops which cannot be taken up by benzol, but which solidifies into crystals on cooling. After recrystallization from a little water, it was ascertained that the compound had a M.P. of 175–177° C. Yield 8 gms.

The same compound may be obtained, but in poorer yields, from N-(caffeino-(8))-propylenediamine and ethylene-chlorohydrine by refluxing in alcohol in the presence of triethylamine or potassium carbonate.

EXAMPLE 7

*N'-(Caffeino-(8))-N-((1)-Hydroxyethyl)-Ethylenediamine*

R=H; $n$=0; $R_1$=H; $R_2$=—$CH_2CH_2OH$ 14 gms. N-(caffeino(8))-amino-ethylchloride and 8 ml. beta-amino-ethanol are refluxed for 6 hours in 80 ml. alcohol. On cooling colorless crystals are obtained which, upon recrystallization from alcohol, melt at 195–197° C. The compound is well soluble in water.

EXAMPLE 8

*N'-(Caffeino-(8))-N,N-bis-((1)-Hydroxyethyl) Ethylenediamine*

R=H; $n$=0; $R_1$=$R_2$=—$CH_2CH_2OH$ 14 gms. beta-N-(caffeino-(8))-aminoethylchloride are heated to 160–170° C. for one hour with 11 ml. diethanolamine. After cooling the mass is taken up with 20 ml. alcohol. Upon standing crystals deposit, M.P.

115–117° C., after which it solidifies and melts again at 142–144° C. Very well soluble in water.

The compounds of the present invention may be incorporated along with appropriate pharmaceutical carriers by admixture therewith into pharmaceutical compositions. Such compositions may be in the dosage form of tablets, capsules, powders, aqueous liquids, elixirs and others. Suitable carriers may be the conventional solid diluents such as lactose, starch, talc, stearic acid, magnesium stearate and liquid diluents such as water, hydroalcoholic mixtures, alcohols and others.

If desired, two or more of the compounds of the present invention may be mixed in a single dosage unit. Effective dosage units may be extrapolated from the pharmacological data given.

It is not desired to be limited except as set forth in the following claims, the above description being by way of illustration of the invention.

What is claimed is:
1. 1-N-morpholine-2-(caffeino-(8))-aminoethylene.
2. 1-N-piperidino-2-(caffeino-(8))-aminoethylene.
3. 1-N-pyrrolidino-3-(caffeino-(8))-aminopropylene.
4. N-phenyl-N'-(caffeino-(8))-propylenediamine.
5. N-(caffeino-(8))-N' - (phenyl-1-isopropyl-(2))-propylenediamine.
6. N'-(caffeino-(8))-N - (1-hydroxyethyl)-propylenediamine.
7. N'-(caffeino-(8))-N-(1-hydroxyethyl) - ethylenediamine.
8. N'-(caffeino-(8)) - N,N - bis-((1)-hydroxyethyl)-ethylenediamine.

References Cited in the file of this patent
UNITED STATES PATENTS

| | | |
|---|---|---|
| 2,879,271 | Kallischnigg | Mar. 24, 1959 |
| 2,928,833 | Leake et al. | Mar. 15, 1960 |

OTHER REFERENCES

Adams et al.: Jour. Amer. Chem. Soc., volume 67, pages 1271–1273 (1945).